(12) United States Patent
Haefner et al.

(10) Patent No.: US 9,636,972 B2
(45) Date of Patent: May 2, 2017

(54) VEHICLE HEATER

(71) Applicant: Eberspächer Climate Control Systems GmbH & Co. KG, Esslingen (DE)

(72) Inventors: Michael Haefner, Stuttgart (DE); Andreas Collmer, Aichwald (DE); Andreas Alber, Stuttgart (DE); Andreas Wetzl, Wernau (DE); Oliver Sauter, Ostfildern (DE); Christoph Köberle, Fellbach (DE); Jörg Zweckbronner, Kuchen (DE); Frank Rudolf, Stuttgart (DE); Dieter Heybach, Hochdorf (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 531 days.

(21) Appl. No.: 14/174,232

(22) Filed: Feb. 6, 2014

(65) Prior Publication Data

US 2014/0217189 A1    Aug. 7, 2014

(30) Foreign Application Priority Data

Feb. 7, 2013 (DE) .................. 10 2013 201 987

(51) Int. Cl.
*B60H 1/22* (2006.01)
*B60H 1/02* (2006.01)
(Continued)

(52) U.S. Cl.
CPC ............ *B60H 1/02* (2013.01); *B60H 1/2203* (2013.01); *F23N 5/003* (2013.01); *F23N 5/14* (2013.01);
(Continued)

(58) Field of Classification Search
CPC ...... B60H 1/2203; B60H 1/2212; B60H 1/22; B60H 2001/2278; B60H 2001/2271; F23N 2041/14; F23N 5/26; F23N 2900/05005
(Continued)

(56) References Cited

U.S. PATENT DOCUMENTS 1,046,421 A * 12/1912 Hayden .................. C01B 21/30
                                                              204/179
4,099,488 A * 7/1978 Damon ................ B60H 1/2209
                                                              122/156
(Continued)

FOREIGN PATENT DOCUMENTS

DE         2432850 A1 * 1/1976 ............... B60H 1/22
DE      GB 1460220 A * 12/1976 ............... B60H 1/22
(Continued)

OTHER PUBLICATIONS

"EP_0433862_A1_M—Machine Translation.pdf", Machine Translation, EPO, Jun. 15, 2016.*
(Continued)

*Primary Examiner* — Gregory Huson
*Assistant Examiner* — Daniel E Namay
(74) *Attorney, Agent, or Firm* — McGlew and Tuttle, P.C.

(57) ABSTRACT

A vehicle heater includes a first housing arrangement (12), a second housing arrangement (14) connected with the first housing arrangement (12) in an adjoining area (32), and at least one sensor (54) with a holding area (62). The holding area (62) is held in the adjoining area (32) in a support path between the first housing arrangement (12) and the second housing arrangement (14).

20 Claims, 4 Drawing Sheets

(51) Int. Cl.
*F23N 5/00* (2006.01)
*F23N 5/14* (2006.01)
*F23N 5/26* (2006.01)

(52) U.S. Cl.
CPC .... *B60H 1/2212* (2013.01); *B60H 2001/2278* (2013.01); *F23N 2025/10* (2013.01); *F23N 2041/14* (2013.01)

(58) Field of Classification Search
USPC ......... 237/12.3 A, 30; 1/12.3 A, 30; 165/41; 431/76, 202
IPC .................................... B60H 1/22; F23N 5/26
See application file for complete search history.

(56) References Cited

U.S. PATENT DOCUMENTS

| | | | | |
|---|---|---|---|---|
| 4,818,219 A | * | 4/1989 | Widemann | B60H 1/2203 126/116 R |
| 4,940,041 A | * | 7/1990 | Riedmaier | B60H 1/2203 126/110 B |
| 5,707,227 A | * | 1/1998 | Langen | B60H 1/2203 237/12.3 C |
| 5,961,311 A | * | 10/1999 | Moore, Jr. | F23N 5/123 126/39 E |
| 6,371,057 B1 | * | 4/2002 | Henderson | F23N 5/26 122/14.2 |
| 6,739,868 B2 | * | 5/2004 | Haefner | F02P 19/00 237/12.3 C |
| 8,053,965 B2 | * | 11/2011 | Boehler | H01T 13/20 313/141 |
| 9,121,603 B2 | * | 9/2015 | Wetzl | F23D 3/40 |
| 2004/0013990 A1 | * | 1/2004 | Haefner | F02P 19/00 431/263 |
| 2009/0126715 A1 | * | 5/2009 | Grassi | F24C 15/10 126/39 R |
| 2012/0104109 A1 | * | 5/2012 | Wetzl | F23D 3/40 237/12.3 C |

FOREIGN PATENT DOCUMENTS

| | | | | |
|---|---|---|---|---|
| DE | FR 2555295 A2 | * | 5/1985 | ............ B60H 1/2203 |
| DE | EP 0433862 A1 | * | 6/1991 | ............... B60H 1/22 |
| DE | 4243712 C1 | * | 6/1994 | ............ B60H 1/2203 |
| DE | 19507556 A1 | * | 4/1996 | ............ B60H 1/2206 |
| DE | 19613759 A1 | * | 10/1997 | ............ B60H 1/2212 |
| DE | 19951181 A1 | * | 5/2001 | ................. F23N 5/10 |
| DE | 10014118 A1 | * | 10/2001 | ............. F02M 37/08 |
| EP | 0 922 594 A2 | | 6/1999 | |
| JP | EP 0922594 A2 | * | 6/1999 | ........... B60H 1/2203 |

OTHER PUBLICATIONS

"DE_2432850_A1_M—Machine Translation.pdf", Machine Translation, EPO, Jun. 16, 2016.*

* cited by examiner

VEHICLE HEATER

CROSS REFERENCE TO RELATED APPLICATIONS

This application claims the benefit of priority under 35 U.S.C. §119 of German Patent Application 10 2013 201 987.4 filed Feb. 7, 2013, the entire contents of which are incorporated herein by reference.

FIELD OF THE INVENTION

The present invention pertains to a vehicle heater, comprising a first housing arrangement and a second housing arrangement connected with the first housing arrangement in an adjoining area.

BACKGROUND OF THE INVENTION

Vehicle heaters, which are used, for example, as auxiliary heaters or parking heaters in vehicles, are designed, in general, such that the feeding of combustion air to a combustion chamber assembly unit is provided through or with a first housing arrangement. For example, such a first housing arrangement is part of a combustion air blower or carries such a combustion air blower and can be designed to define a combustion air flow space. The heat of combustion generated in the combustion chamber assembly unit during the combustion operation is transported in combustion waste gases and transmitted to a heat carrier medium in the area of a second housing arrangement. The second housing arrangement can consequently be designed to provide essentially a heat exchanger arrangement, which is used, on the one hand, to guide the combustion waste gases in the direction of the waste gas outlet, and is used, on the other hand, to establish a heat transmission interaction between the combustion waste gases and the heat carrier medium. The two housing arrangements are connected with one another in an adjoining area. To obtain information on the operating state, especially the combustion operation, so-called flame sensors are known to be used in such vehicle heaters. These may be designed, for example, as temperature sensors and detect the temperature of gases flowing in the vehicle heater, generally of the combustion waste gases. Depending on the state of combustion or depending on whether combustion is taking place or not, such a temperature sensor or flame sensor sends a corresponding signal, which can be input into an actuating arrangement and analyzed there.

SUMMARY OF THE INVENTION

The object of the present invention is to provide a vehicle heater, with which reliable information can be provided on the operation of the vehicle heater with a simple design.

This object is accomplished according to the present invention by a vehicle heater, comprising a first housing arrangement, a second housing arrangement connected with the first housing arrangement in an adjoining area, at least one sensor with a holding area, wherein the holding area is held in the adjoining area in the support path between the first housing arrangement and the second housing arrangement.

A sensor, which can be used for example, as a flame sensor, is clamped or held in the design of a vehicle heater according to the present invention in an area in which two assembly units of the vehicle heater, namely, the two housing arrangements, adjoin each other. This means that no additional structural measures are necessary to make it possible to carry such a sensor on the vehicle heater and especially to bring into interaction with the gases flowing therein.

The design according to the present invention may be, for example, such that the first housing arrangement has a first support area, that the second housing arrangement has a second support area, and that the first support area and the second support area are supported in relation to one another in the adjoining area with the interposition of a sealing arrangement.

It is provided, in an especially advantageous embodiment, that the holding area is held between a housing arrangement and the sealing arrangement. Using the elasticity of such a sealing arrangement, stable holding interaction can be generated in this manner with the holding area.

To make it possible to position the sensor, which is designed, in general, as an elongated component, in the area of the two housing arrangements, it is provided that the first housing arrangement and the second housing arrangement have an access opening for the at least one sensor.

To insert the sensor into these openings, provisions may be made, considering the circumstance that the sensor is to be connected, in general, with the actuating arrangement by a cable connection, for the access opening of at least one housing arrangement to be open in a circumferential area.

An impairment of the contact interaction of the two housing arrangements can be avoided, especially also by utilizing the elasticity of the sealing arrangement, by a recess being provided in the support area of at least one housing arrangement for receiving the holding area.

Provisions may be made in the design according to the present invention for structurally separating the tasks of combustion air feed, on the one hand, and heat transmission, on the other hand, for the first housing arrangement to comprise a combustion air guide housing, preferably blower housing, and for the second housing arrangement to comprise a heat exchanger housing, and provisions may, furthermore, be made for providing a combustion chamber assembly unit in a space enclosed by the first housing arrangement and the second housing arrangement.

A separation of the area in which combustion air is fed from the area in which the combustion waste gases flow can be embodied in a simple manner by utilizing the combustion chamber assembly unit by the combustion chamber assembly unit comprising a preferably disk-shaped carrier and by the carrier being held in the support path between the first housing arrangement and the second housing arrangement. Stable holding interaction of the carrier with the two housing arrangements can be achieved in this case, utilizing the elasticity of the sealing arrangement, by the sealing arrangement comprising a first sealing element between the first housing arrangement and the carrier and a second sealing element between the carrier and the second housing arrangement.

Provisions may, for example, be made for the holding area to be held between the first sealing element and the first housing arrangement. This makes it possible to lead through a cable connection of the sensor from the area of the first housing arrangement.

The at least one sensor may be preferably designed as a temperature sensor for detecting gases, for example, combustion waste gases, flowing in a waste gas flow path in the second housing arrangement.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
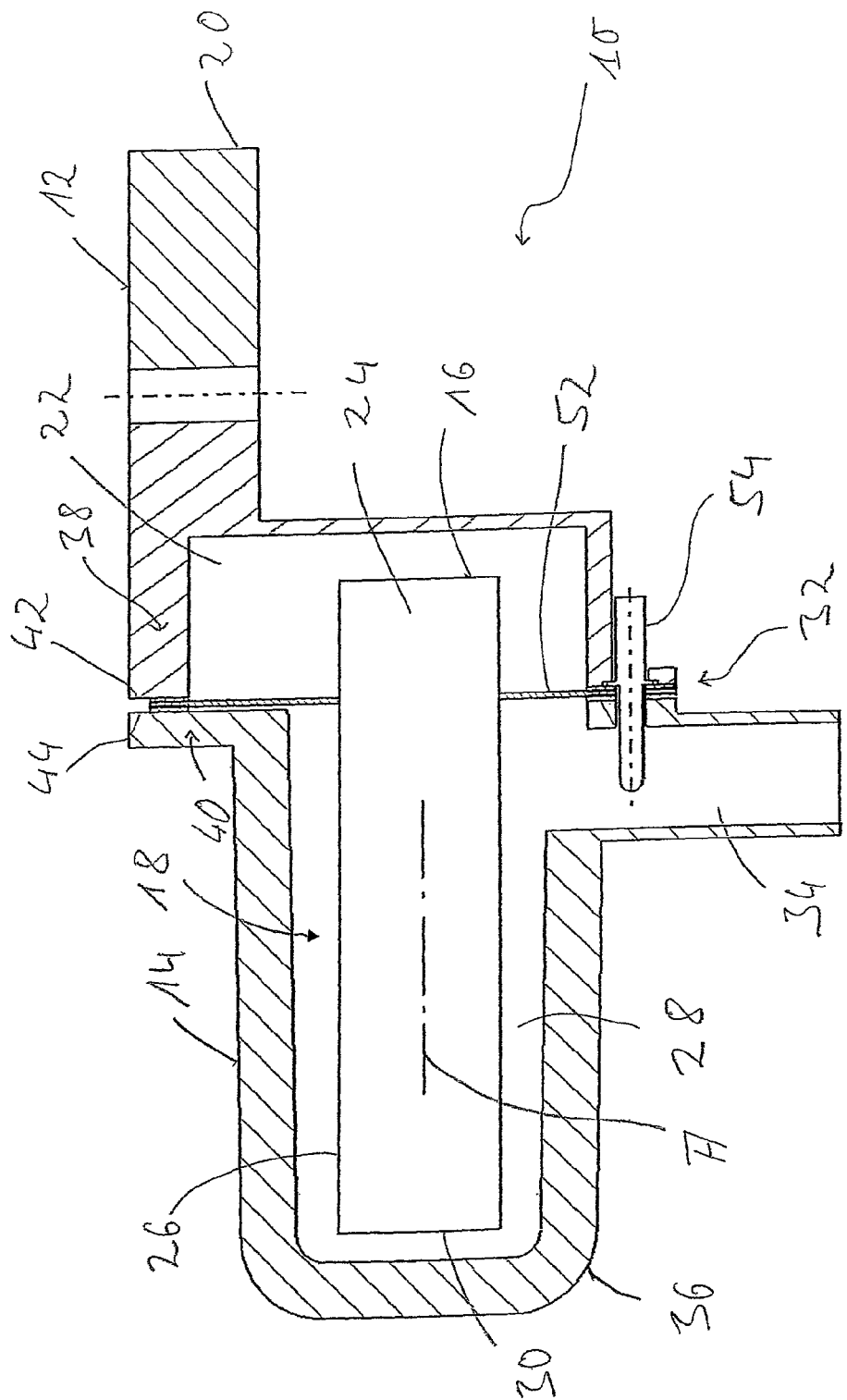
FIG. 1 is a longitudinal sectional view of a vehicle heater with the essential vehicle heater assembly units.

Referring to the drawings in particular, a fuel-operated vehicle heater, which can be used, for example, as a parking heater or auxiliary heater, is generally designated by 10 in FIG. 1. The vehicle heater 10 is shown with vehicle heater components that are essential for the explanation of the present invention partly in a schematic view.

The vehicle heater 10 comprises as essential components a first housing arrangement 12, a second housing arrangement 14 and a combustion chamber assembly unit generally designated by 16. The first housing arrangement 12 and the second housing arrangement 14 define a space area 18, in which essentially the combustion chamber assembly unit 16 is accommodated.

The first housing arrangement 12 may be part of a blower housing generally designated by 20, for example, of a side channel blower, through which the combustion air necessary for the combination in the combustion chamber assembly unit 16 is delivered into a first space part 22 of the space 18 defined essentially by the first housing arrangement 12. In a combustion chamber 24 of the combustion chamber assembly unit 16, into which the combustion air can enter and into which fuel is fed via a fuel feed line, not shown, the combustion air/fuel mixture generated there is burnt during the combustion operation. The combustion waste gases flow along a flame tube 26 of the combustion chamber assembly unit, which said flame tube extends essentially in a second space part 28 of the space 18 defined by the second housing arrangement 14. The combustion waste gases leave the flame tube 26 at the end 30 thereof, which is open, for example, axially, and are deflected by the second housing arrangement 14 and sent back in the direction of the first housing arrangement 12. A waste gas outlet 34 extending laterally away in relation to the flame tube 26 is formed in the second housing arrangement 14 in an adjoining area 32 between the first housing arrangement 12 and the second housing arrangement 14.

It should be pointed out that the second housing arrangement 14 may provide essentially a heat exchanger arrangement 36, which, composed, for example, from an inner, pot-shaped housing and an outer, pot-shaped housing, defines the space area 28, on the one hand, and a flow space for the heat carrier medium to be heated between these two pot-shaped housings, on the other hand.

The first housing arrangement 12 and the second housing arrangement 14 have support areas 38, 40 oriented such that they face each other at a support path in the adjoining area 32. The first support area 38 provided at the first housing arrangement 12 may be provided essentially for a support surface 42, which has, for example, an annular design, and whose surface normal may be oriented to the left in the view shown in FIG. 1. The second support area 40 provided at the second housing arrangement 14 may correspondingly comprise a support surface 44 having an annular design, which is oriented such that it faces the first-mentioned support surface 42 of the first support area 38 in the view shown in FIG. 1, so that the two housing arrangements 12, 14 with their two support surfaces 42, 44 are located axially opposite each other in the direction of a central longitudinal axis A of the combustion chamber assembly unit 16.

Figure 2:
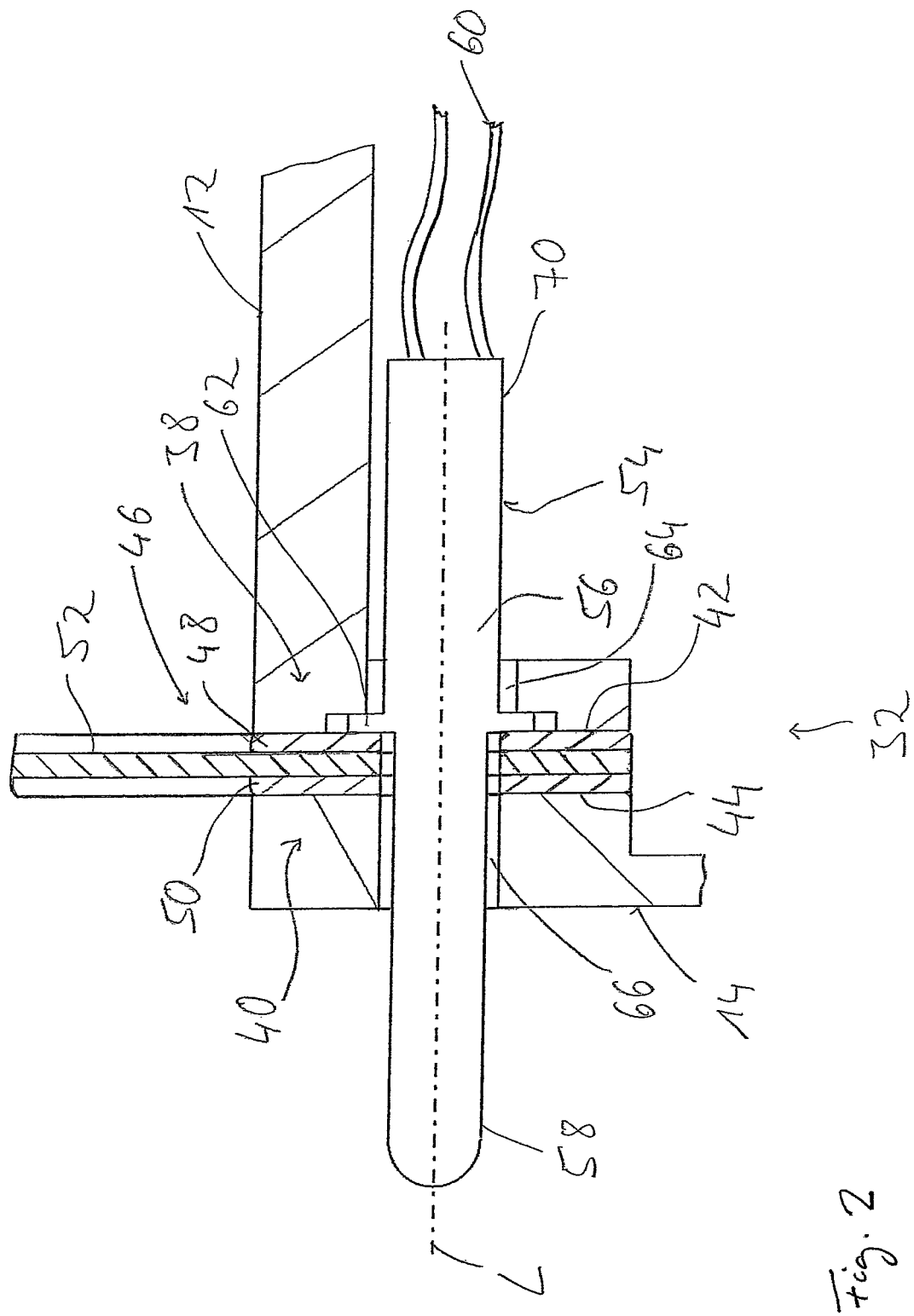
FIG. 2 is a detailed view of the heater shown in FIG. 1 in the area of a sensor.

A sealing arrangement 46, which can also be clearly recognized in FIG. 2, with two sealing elements 48, 50, which are correspondingly of an annular design corresponding to the configuration of the support surfaces 42, 44, which have, for example, an annular design, and which are preferably made of an elastic material, is located between the two support areas 38, 40 or the support surfaces 42, 44. These sealing elements 48, 50 extend along the entire adjoining area 32 and thus provide a fluid-tight closure of the space 18.

A carrier 52 of the combustion chamber assembly unit 16, which said carrier 52 is, for example, ring-shaped or disk-shaped, is positioned between these two sealing elements 48, 50. On the one hand, the first space part 22 is separated by this carrier 52 from the second space part 28 in a fluid-tight manner. On the other hand, this carrier 52 carries the combustion chamber assembly unit 16 on the two housing arrangements 12, 14. The arrangement is such that the carrier 52 is connected by the sealing element 48 relative to the housing arrangement 12 in a fluid-tight manner and is connected by the sealing element 50 in a fluid-tight manner relative to the second housing arrangement 14. The two housing arrangements 12, 14 can be braced against each other by connection elements provided along the adjoining area, for example, studs or the like, so that they are ultimately supported on one another and held against one another with their two support areas 38, 40 with the interposition of the sealing arrangement 32 and of the carrier 52.

A sensor 54, which can be used, for example, as a flame sensor, is advantageously provided in the vicinity of the waste gas outlet 34 in the vehicle heater 10 recognizable in FIG. 1. This sensor 54 comprises a sensor body 56 extending along a longitudinal sensor axis L. The longitudinal sensor axis L may advantageously be oriented essentially in parallel to the longitudinal axis A of the combustion chamber assembly unit 16. The sensor 54 is provided with heat-sensitive elements, for example, electric conductors with temperature-dependent resistance, in an end area 58 located in the path of the waste gas, for example, in the area of the waste gas outlet 34. These elements may be in connection with an actuating arrangement via a line connection 60. Taking the temperature signal thus generated into account, it is possible to provide information from which the combustion process taking place in the combustion chamber assembly unit 16 can be inferred.

A holding area 62 of an annular or flange-like design may be provided at the sensor body 56, for example, in a central longitudinal area thereof. Associated with this holding area 62, an access opening 64 is formed in the support area 38 of the first housing arrangement 12 in the example being shown. An access opening 66 is formed correspondingly in the adjoining area 40 of the second housing arrangement 14, so that the sensor 54 can be passed through these access openings aligned with one another and through corresponding access openings formed in both the sealing elements 48, 50 and the carrier 52 and the sensor can extend with its end area 58 into the waste gas flow path. Furthermore, a recess 68, surrounding the access opening 64, is formed in the support surface 42 in the support area 38. The holding area 62 can be accommodated essentially in this recess 68, so that it ends approximately flush with the support surface 42 or slightly projects in the direction of the longitudinal sensor axis L. The holding area 62 is thus located in the support path between the two housing arrangements 12, 14, especially between the sealing arrangement 32 or the sealing element 48 and the support area 38 of the first housing arrangement 12. Thus, as the waste gas flow path is also sealed in a fluid-tight manner in the area of the access opening 66, stable holding action generated by the elasticity of the sealing element 48 is also guaranteed for the sensor 54.

Figure 3:
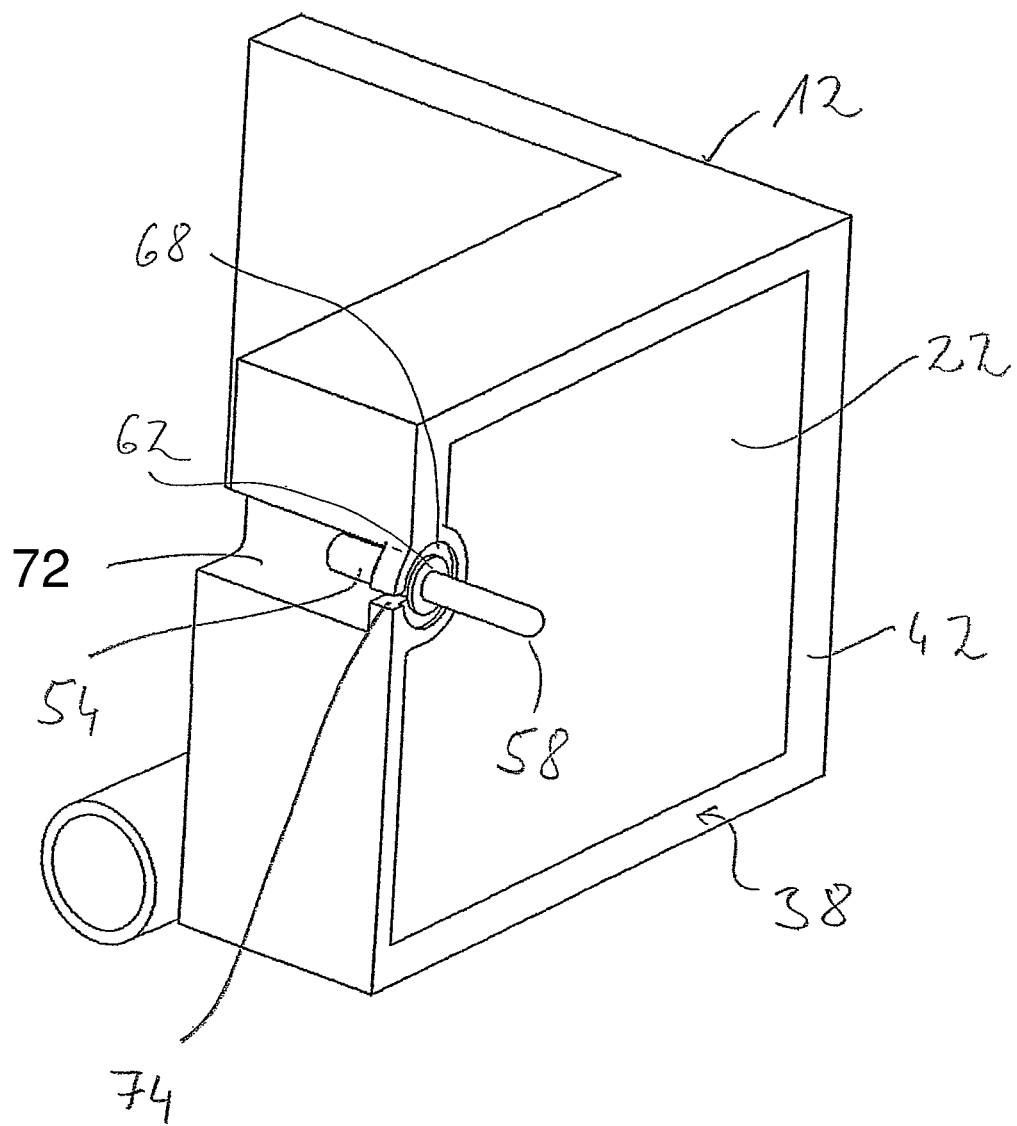
FIG. 3 is a perspective view of a first housing arrangement with a sensor.
Figure 4:
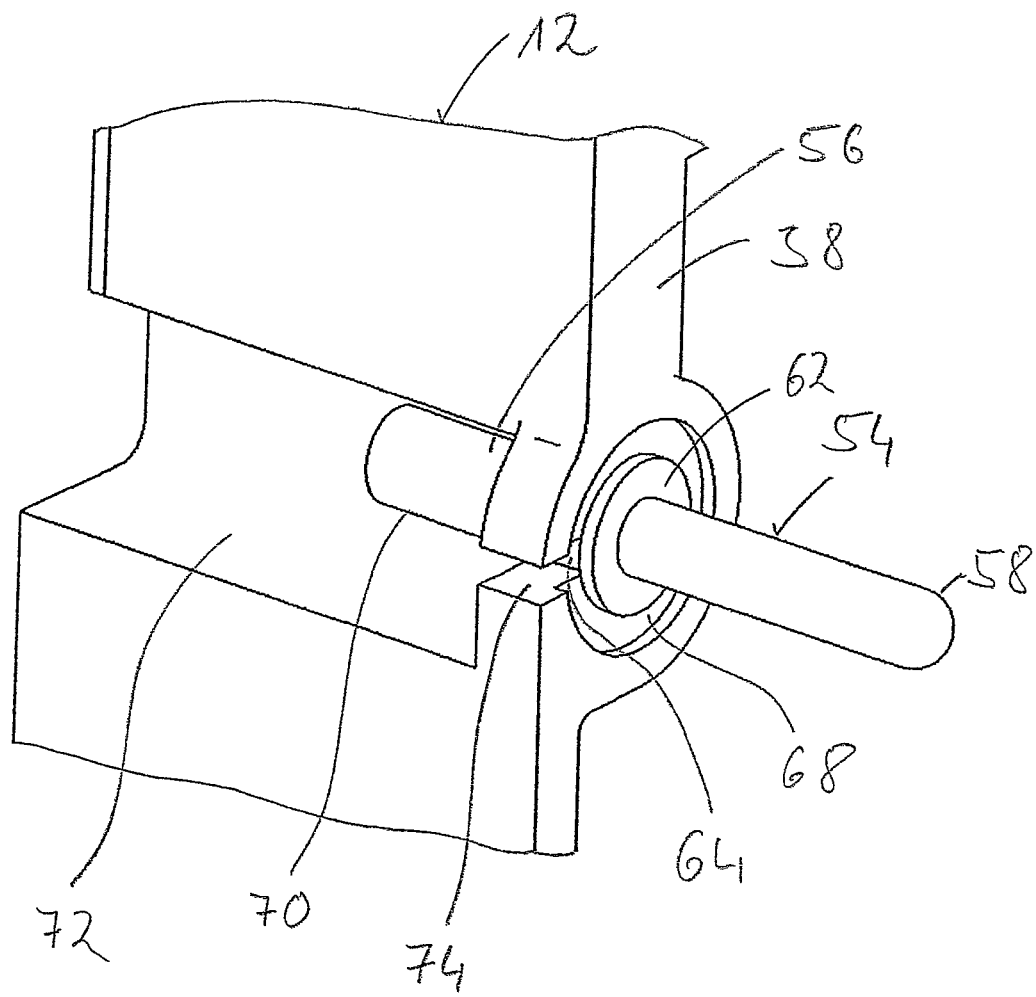
FIG. 4 is a detailed view, which shows the area of the sensor in FIG. 3.

It can be recognized in FIGS. 3 and 4 that the access opening 64, with which, for example, a recess 72 accommodating the rear part 70 of the sensor 54 is associated in the first housing arrangement 12, is open with an interruption 74 in an area that is directed outwardly, i.e., away from the first space part 22. This interruption 74 may be used to laterally insert the connection line 60 provided with a plug contact at its end area, not shown, into the access opening 64, and the sensor 54 can then be passed with its rear part 70 through the access opening 64 in the view shown in FIG. 4 until the holding area 62 comes to lie in the recess 68 and is supported at the bottom area thereof. The difficulty or impossibility of insertion through the access opening 64, which may possibly occur due to the size of the plug contact, can thus be avoided. It should be pointed out that the interruption 74 may also be dimensioned such that the entire sensor 54 with its area positioned in the opening 64 can be inserted laterally. For example, the access opening 64 can be provided with an essentially U-shaped design, i.e., a shape with which the interruption 74 has the same width as the access opening 64 per se.

It is possible with the above-described design to hold the sensor 54 at the vehicle heater 10 in a stable manner and secured against discharge of combustion waste gases or the like in a simple and reliable manner, without taking additional structural measures for arranging said sensor. Thus, it becomes possible, in particular, to position the sensor 54 such that its sensitive area, i.e., the end area 58, can be positioned in the waste gas flow path, so that it can provide information on the combustion process in the combustion chamber assembly unit 16 because of its heat sensitivity.

It should finally be pointed out that the design especially of the two housing arrangements 12, 14 may, of course, differ from the design shown. It is important that these two housing arrangements be in contact with one another in an adjoining area and that a stable holding can be achieved for the sensor 54 there in the support path between these two housing arrangements, possibly also with the cooperation of the sealing arrangement 32.

While specific embodiments of the invention have been shown and described in detail to illustrate the application of the principles of the invention, it will be understood that the invention may be embodied otherwise without departing from such principles.

What is claimed is:

1. A vehicle heater comprising:
   a first housing arrangement having a first support area;
   a second housing arrangement connected with the first housing arrangement in an adjoining area, the second housing arrangement having a second support area;
   a sensor with a holding area, the holding area being held in the adjoining area in a support path between the first housing arrangement and the second housing arrangement;
   a sealing arrangement, the first support area and the second support area being supported in relation to one another in the adjoining area with the interposition of the sealing arrangement, the holding area being held between one of the first housing arrangement and the second housing arrangement and the sealing arrangement.

2. A vehicle heater in accordance with claim 1, wherein one of the first housing arrangement and the second housing arrangement have an access opening for the sensor.

3. A vehicle heater in accordance with claim 2, wherein the access opening of the one of the first housing arrangement and the second housing arrangement is open in a circumferential area.

4. A vehicle heater in accordance with claim 1, wherein a recess is provided in one of the first support area and the second support area for accommodating the holding area.

5. A vehicle heater in accordance with claim 1, wherein the first housing arrangement comprises a combustion air guide housing and the second housing arrangement comprises a heat exchanger housing.

6. A vehicle heater in accordance with claim 1, further comprising a combustion chamber assembly unit provided in a space enclosed by said first housing arrangement and said second housing arrangement.

7. A vehicle heater in accordance with claim 6, wherein the combustion chamber assembly unit comprises:
   a disk-shaped carrier held in the support path between the first housing arrangement and the second housing arrangement.

8. A vehicle heater in accordance with claim 7, wherein:
   the sealing arrangement comprises a first sealing element between the first housing arrangement and the carrier, and a second sealing element between the carrier and the second housing arrangement.

9. A vehicle heater in accordance with claim 8, wherein the holding area is held between the first sealing element and the first housing arrangement.

10. A vehicle heater in accordance with claim 1, wherein the sensor is a temperature sensor for detecting the temperature of gases flowing in a waste gas flow path in the second housing arrangement.

11. A vehicle heater in accordance with claim 1, wherein the first housing arrangement comprises a blower housing and the second housing arrangement comprises a heat exchanger housing.

12. A vehicle heater in accordance with claim 1, wherein:
   the first housing arrangement and the second housing arrangement are supported to each other through said support path.

13. A vehicle heater comprising:
   a first housing arrangement with a first housing adjoining interface;
   a second housing arrangement with a second housing adjoining interface, the first housing arrangement being connected to the second housing arrangement in an adjoining area defined by the first housing adjoining interface and the second housing adjoining interface;
   a combustion chamber assembly unit provided in a space enclosed by said first housing arrangement and the second housing arrangement, wherein the first housing arrangement comprises a combustion air guide housing and the second housing arrangement comprises a heat exchanger housing;

a sensor with a holding area, the holding area being held in the adjoining area between the first housing arrangement and the second housing arrangement, the sensor extending from the first housing arrangement into the second housing arrangement.

14. A vehicle heater in accordance with claim 13, further comprising a sealing arrangement, wherein:

the first housing adjoining interface includes a first support area;

the second housing adjoining interface includes a second support area; and the first support area and the second support area are supported in relation to one another in the adjoining area with the interposition of the sealing arrangement.

15. A vehicle heater in accordance with claim 14, wherein the holding area is held between one of the first housing adjoining interface and the second housing adjoining interface and the sealing arrangement.

16. A vehicle heater in accordance with claim 15, wherein a recess is provided in one of the first support area and the second support area for accommodating the holding area.

17. A vehicle heater in accordance with claim 13, wherein one of the first housing arrangement and the second housing arrangement have an access opening, the access opening accommodating or providing access to the sensor.

18. A vehicle heater in accordance with claim 17, wherein the access opening of the one of the first housing arrangement and the second housing arrangement is open in a circumferential area.

19. A vehicle heater in accordance with claim 13, wherein:

the heat exchanger housing of the second housing arrangement defines a space area on an inside guiding combustion gases from the combustion chamber, the heat exchanger housing having an outside defining a flow space for a heat carrier medium to be heated by the combustion gases;

the sensor is held in the adjoining area by interaction between the first housing arrangement and the second housing arrangement, the sensor being mounted to extend into the space area of the heat exchanger housing and be in contact with the combustion gases.

20. A vehicle heater in accordance with claim 19, further comprising:

a disk-shaped carrier held in the adjoining area by force from a connection of the first housing arrangement to the second housing arrangement, the disk-shaped carrier mounting the combustion chamber assembly unit between the first housing arrangement and the second housing arrangement;

the holding area of the sensor being held in the adjoining area by force from a connection of the first housing arrangement to the second housing arrangement.

* * * * *